DEMOUNTABLE SYSTEM FOR FLYING SPOT SCANNER

Filed Oct. 4, 1968 3 Sheets-Sheet 1

INVENTORS
DONALD J. CROSS
GEORGE C. WAYBRIGHT
BY Cyril A. Krenzer
ATTORNEY

INVENTORS
DONALD J. CROSS
GEORGE C. WAYBRIGHT

BY [signature]
ATTORNEY

DEMOUNTABLE SYSTEM FOR FLYING SPOT SCANNER

Filed Oct. 4, 1968 3 Sheets-Sheet 3

INVENTORS
DONALD J. CROSS
GEORGE C. WAYBRIGHT
BY
Cyril A. Krenzer
ATTORNEY

United States Patent Office 3,527,884

Patented Sept. 8, 1970

3,527,884

DEMOUNTABLE SYSTEM FOR FLYING SPOT SCANNER

Donald J. Cross, Tonawanda, and George C. Waybright, Batavia, N.Y., assignors to Sylvania Electric Products Inc., a corporation of Delaware Filed Oct. 4, 1968, Ser. No. 765,237
Int. Cl. H01j *29/02*
U.S. Cl. 178—7.81 10 Claims

ABSTRACT OF THE DISCLOSURE

In a television set incorporating means to display photographic film on the face of the television picture tube, a flying spot scanner tube is mounted on a partition wall of a cabinet in such a manner that its position is predetermined with relationship to a chassis which contains equipment to convert light signals passing through the film from the scanner tube into electrical signals to be transmitted to a television chassis. Parts are so arranged that the scanner tube and its support may be placed in proper orientation directly on the chassis in lieu of on the partition wall, when the chassis is removed from the cabinet, as for servicing.

BACKGROUND AND OBJECTS OF THE INVENTION

This invention relates to a means for mounting a flying spot cathode ray tube on a vertical partition wall in a television cabinet and alternatively on a chassis.

It is an object of this invention to mount a flying spot scanner tube on a partition wall of a cabinet so that it may be taken off and replaced with ease and in proper relationship to a chassis normally on the opposite side of the partition wall, when the chassis is removed from the cabinet.

It is a further object of the invention to so mount the scanner tube so that it may be easily adjusted toward and from the chassis on the opposite side of the wall.

Yet another object of the invention is to provide a means whereby the scanner tube and its support may be mounted directly on the chassis with which it is associated for a scanning operation, as when the chassis is removed from the cabinet for servicing.

BRIEF SUMMARY OF THE INVENTION

According to one aspect of the invention, an alignment gauge is utilized to accurately align a mounting plate with a chassis containing an optical system. Then the flying spot scanner tube and yoke assembly mount is indexed and secured to the mounting plate whereby the flying spot scanning tube is accurately aligned with respect to the optical system of the chassis.

According to another aspect of the invention, the mount for the flying spot scanner tube and yoke assembly is movable, thereby permitting optical adjustments for different size films without changing the size of the raster on the screen of the flying spot scanner tube.

DESCRIPTION OF THE PREFERRED EMBODIMENTS

For a better understanding of the present invention, together with other and further objects, advantages and capabilities thereof, reference is made to the following disclosure and appended claims in connection with the above-described drawings.

Figure 1:
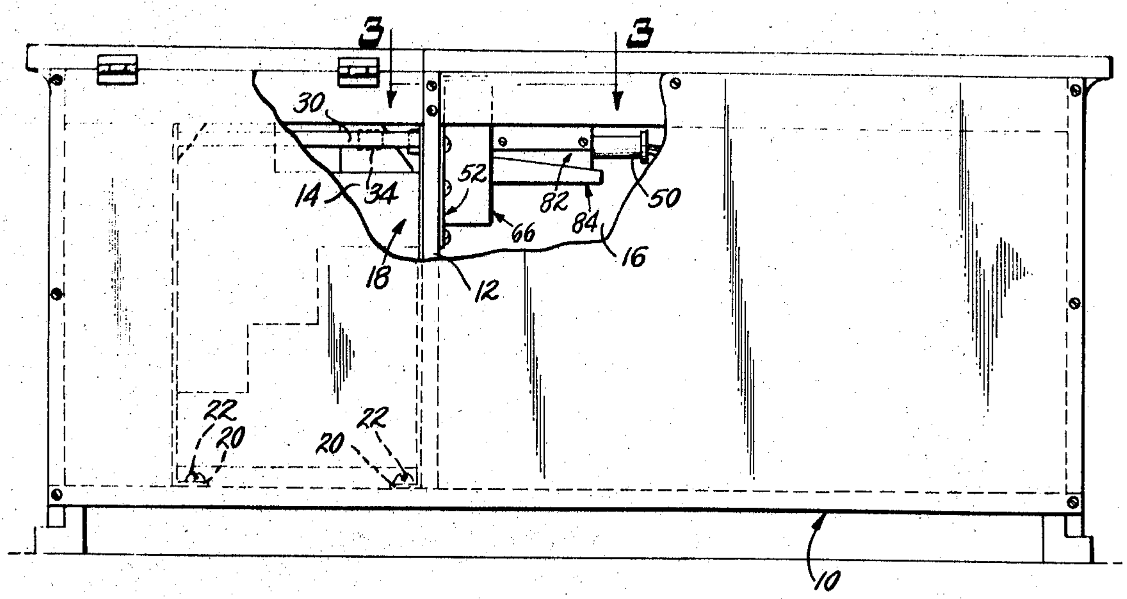
FIG. 1 is a rear view of a television cabinet incorporating therein the flying spot scanner tube and an associated chassis, the back cover being broken away to expose certain parts and the chassis associated with the scanner tube being shown partly in full and partly in dotted lines.
Figure 2:
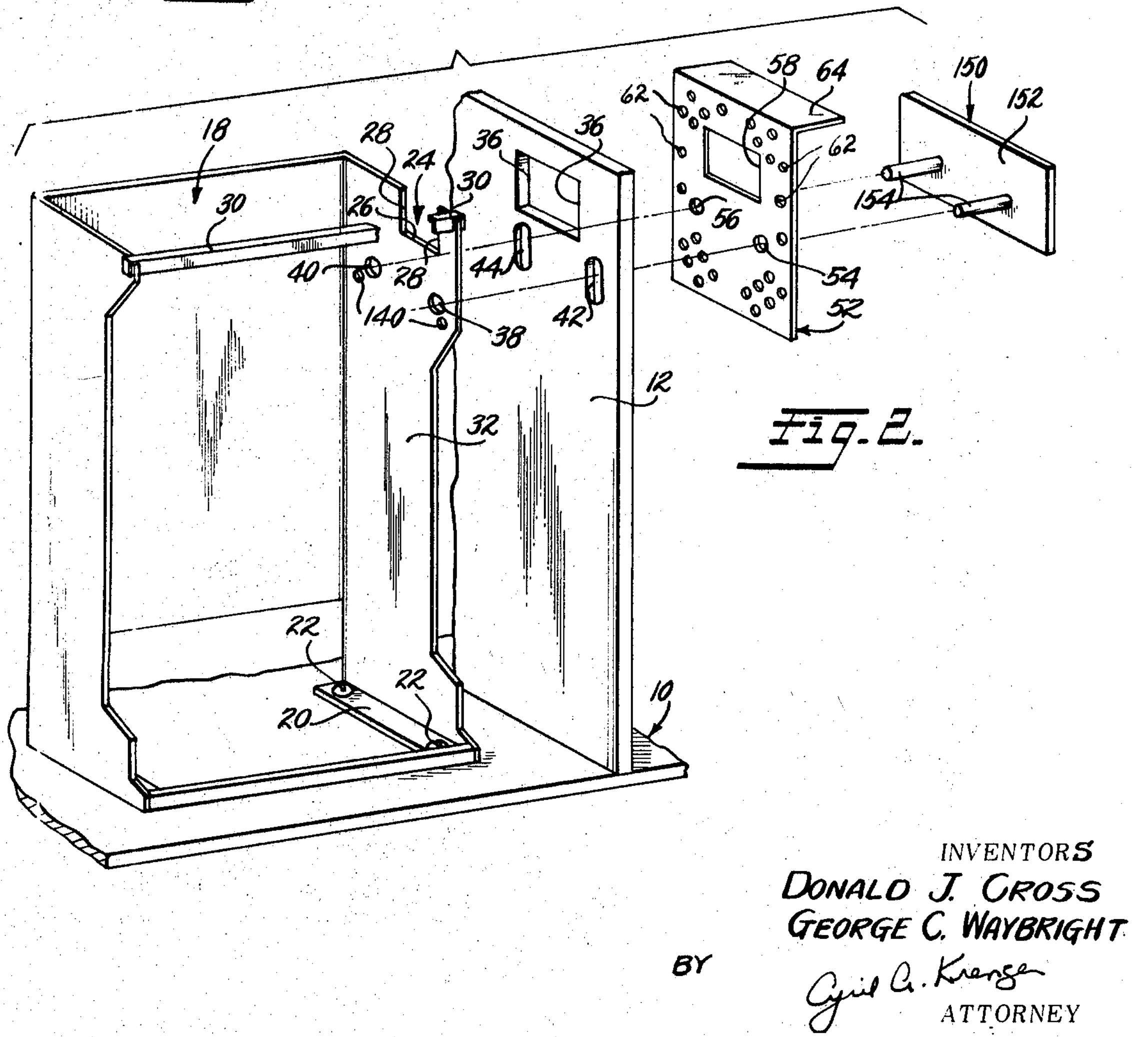
FIG. 2 is an exploded view showing the chassis, partition wall, a mounting plate and a jig, the jig being utilized to properly position the mounting plate on the partition wall with respect to the chassis.

Now referring to the drawings in greater detail, in FIG. 1 there is shown a cabinet 10 having a vertical partition wall 12, as of wood, separating the cabinet into two compartments 14 and 16.

In compartment 16 is housed conventional elements, not shown, for producing a color television image on the screen of a cathode ray tube from signals received via ether waves as well as additional elements for receiving signals created as a result of light scanning of color slides or color film fed to a location in compartment 14.

In said compartment 14 there is located a vertical chassis 18 provided with means for fastening the chassis to the cabinet, as legs 20 on the chassis fastened by screws 22 passing into the base of the cabinet. The chassis has an opening 24 therein formed by a flat horizontal surface 26 and vertical walls 28 for the light from the flying spot scanning tube. A strap 30 across the chassis 18 serves to locate the carrier mechanism laterally of the chassis, additionally providing support for the chassis in proper location. The vertical wall 32 of the chassis is mounted close to the partition wall 12 of the cabinet and parallel thereto, with a light receiving objective lens 34, shown diagrammatically, in horizontal and vertical alignment with respect to a rectangular opening 36 in the partition wall, this opening being sufficiently large to enable a scanning light ray from a tube in compartment 16 to pass therethrough and be received by the objective lens without precise positioning of the chassis 18 vertically or horizontally or laterally spaced from the opening 36.

For the purpose of aligning the scanning ray tube in compartment 16 with respect to the chassis, the wall 32 of the chassis is provided with two alignment openings 38 and 40 widely spaced apart and in horizontal alignment for receiving the legs of an alignment jig to be described. Also the partition wall 12 of the cabinet is provided with two openings 42 and 44 spaced apart a distance substantially equal to the spacing of the openings 38 and 40 and of much larger dimensions vertically and horizontally of the partition wall to allow for freedom of movement of the jig legs vertically and laterally of the partition wall in securing alignment of parts, as will be described. If desired, the openings may be vertical slots in the wall 12. Thus, initially the chassis 18 is mounted in compartment 14 of the cabinet with the openings 38 and 40 positioned opposite the slots 42 and 44 in the partition wall.

For a complete understanding of the mechanism which is mounted in the chassis, reference is made to the application of Charles Neal et al., filed Aug. 1, 1967, Ser. No. 657,623, for "Color Reproduction System." That application discloses how the scanning light beam is treated after passing through the slide or film for reproduction of the slide or film on the face of the color picture tube in compartment 16. For the purpose of disclosure of this invention, it is merely necessary to point out that electrical color signals resulting from scanning of the slide or film held before the objective lens 34 are fed to the color amplifying matrix of the television set in compartment 16 for reproduction of the slide or film on the face of the color picture tube in compartment 16.

On the face of the partition wall in compartment 16, is mounted the flying spot scanner tube 50. This tube receives its vertical and horizontal scanning pulses in synchronism with the pulses received by the color television circuitry in compartment 16. While the slide or film is being reproduced on the TV color cathode ray tube, the normal video signal from the tuner to the video output tube is interrupted by switching mechanism as disclosed in said application of Charles Neal et al.

The means for mounting the flying spot scanner tube 50 will now be described. Fastened to the wall 12 within the compartment 16 is a metallic mounting plate 52. This plate has two alignment holes 54 and 56 of a size identical with the alignment openings 38 and 40 in wall 32 of the chassis and in horizontal alignment, these holes being positioned below a rectangular opening 58 in the plate. When the legs of the jig to be described are passed through these holes 54 and 56, the slots 42 and 44 in partition wall 12 and the openings 38 and 40 in wall 32 of chassis 18, the rectangular opening 58 is properly aligned with objective lens 34 supported in the chassis 18 and with the much larger opening 36 in partition wall 12. When so positioned by the jig, the mounting plate is fastened to the partition wall by screws 60 passing through any selected holes 62, these being smaller than the alignment holes in the mounting plate. The mounting plate has a top flange 64 to provide X-ray and dust shielding for the scanner tube, as will be made clear. This mounting plate is permanently fastened to the partition wall, after alignment by the jig.

Figures 5, 6:
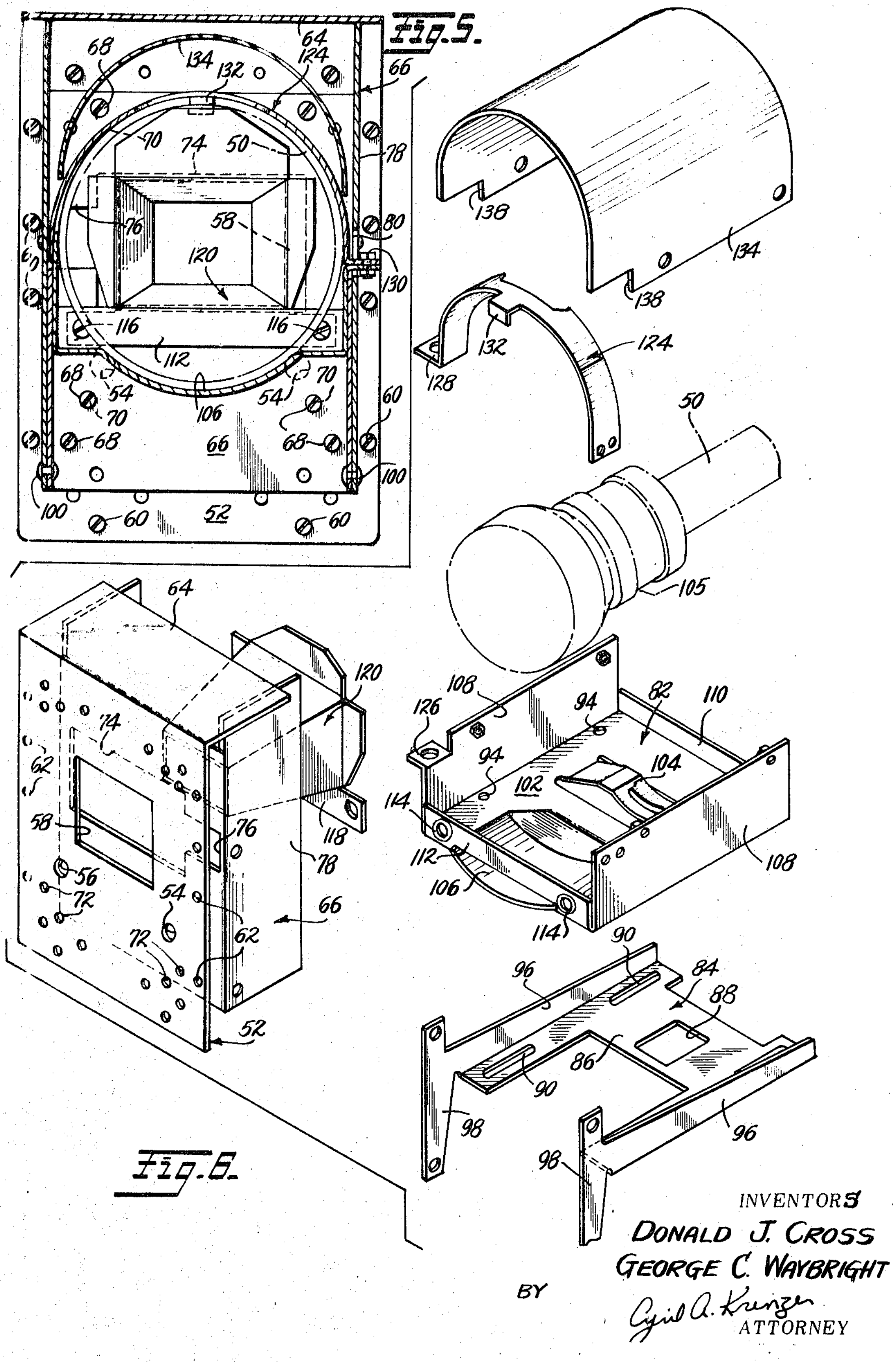
FIG. 5 is a section on the line 5—5 of FIG. 4.
FIG. 6 is an exploded view showing parts constituting the mounting means for the flying spot scanner tube; also the tube itself and associated shielding means.

Secured to the mounting plate, see FIGS. 5 and 6, is a bracket supporting plate 66, as by self-tapping screws 68 passing freely through any selected holes 70 in the bracket supporting plate and holes 72 in mounting plate 52, smaller than holes 70, into which the self-tapping screws are threaded.

The bracket supporting plate 66 is provided with a generally rectangular opening 74 registering with the opening 58 in the mounting plate 52 and a side slot 76 for clearance of certain side screws on chassis 18 when the plate 66 is directly associated with the chassis for test purposes, as will be explained. Also, the bracket supporting plate is provided with side flanges 78, one of which is provided with a slot 80, FIG. 5, for clearance of strap portions which hold the scanning tube to a metallic slide 82. The flanges 78 serve to shield the scanning tube against stray X-ray emanation and for rigid securement thereto of a slide support 84.

Figure 4:
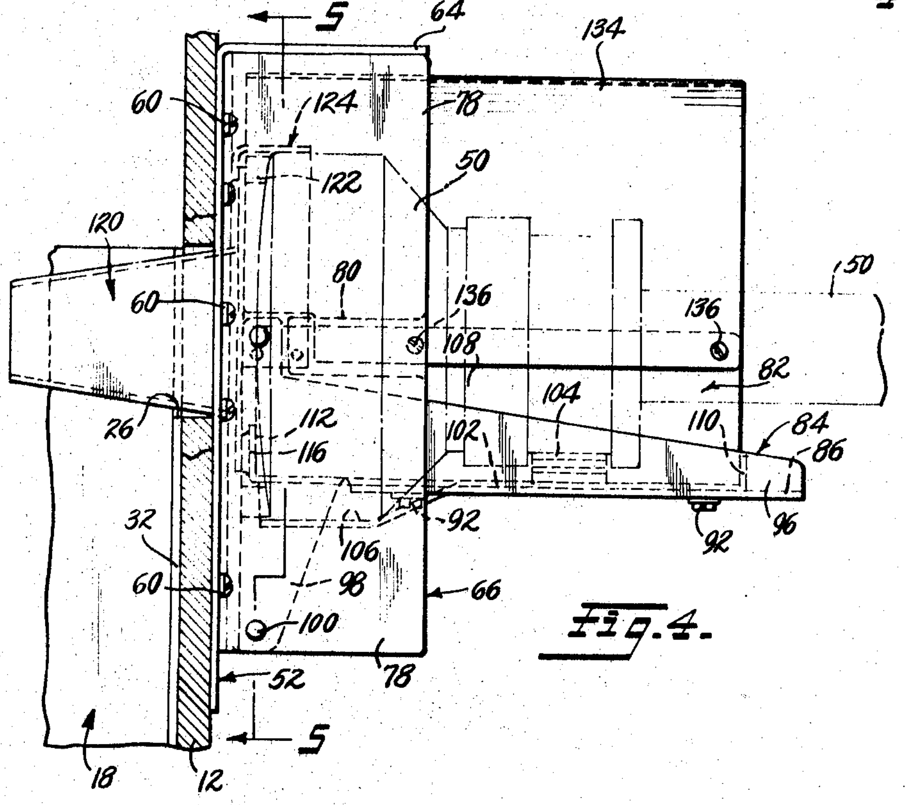
FIG. 4 is a view taken on the line 4—4 of FIG. 3, a portion of a scanner tube being shown in broken lines.

The slide support 84, see particularly FIGS. 4 and 6, is metallic and comprises a flat web 86 having a central opening 88 for access to a screw in the yoke assembly of the scanning tube and four slots 90 in side portions of the support for reception of bolts 92 which pass through the slots and into tapped holes 94 in the slide 82. Upstanding flanges 96 on the support provide side guides for the slide and also support for bracket portions 98 which are riveted to the flanges 78 of the plate 66 as indicated at 100. Thus the slide support and plate 66 constitute an integral unit.

Figure 3:
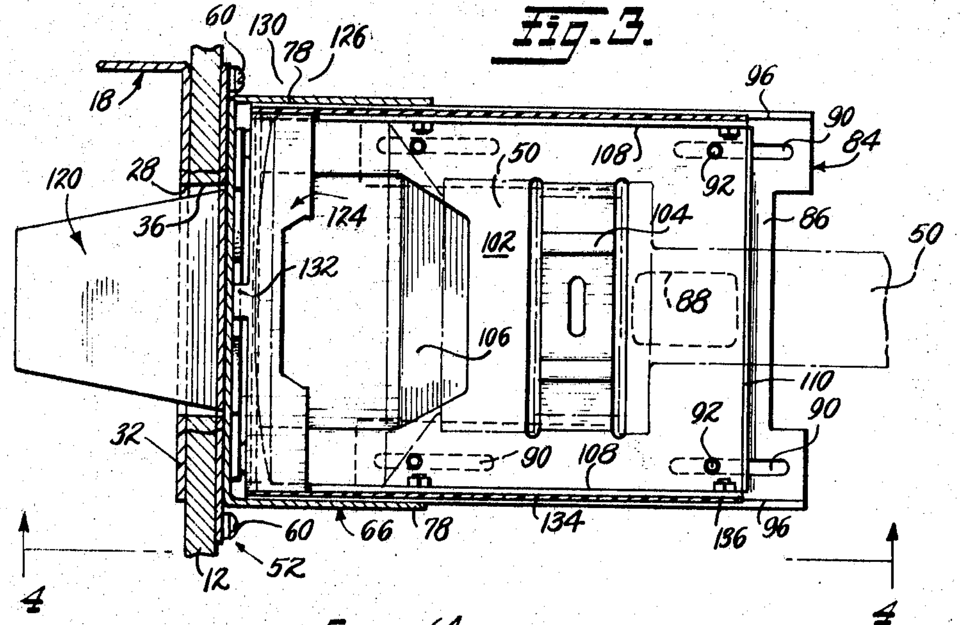
FIG. 3 is a section on the line 3—3 of FIG. 1.

The slide 82 has a horizontal web portion 102 with a raised arcuate saddle 104 to support the yoke 105 of the flying spot scanner tube 50 and a depressed seat 106 for the front flared end of the tube. The saddle 104 may include a slot (not shown) for rotatably aligning the yoke so that the scanner tube raster coincides with the film. A pair of side upstanding flanges 108 are provided to partially shield the tube. Reinforcing flanges 110 and 112 are provided at the rear and front ends of the slide, the front flange 112 being provided with bosses 114 into which self-tapping screws 116, see FIG. 4, may be screwed. The screws are passed freely through the bottom of a flange portion 118 of a metallic hood 120 which serves as a combined X-ray shield, light shielding hood and means for the inhibiting the gathering of dust on the face of the scanner tube. If desired, a light excluding rubber gasket 122 may be inserted between the flange portion of the hood and the face of the tube. The hood is a frustum of a rectangularly based cone and is positioned in the slide to expose the central portion of the scanner tube, the hood extending through the partition wall 12 with the free end of the hood adjacent the chassis 18. The tube 50 is retained in place by an arcuate strap 124 riveted at one end to a flange 108 of the slide and at the other end fastened to a lip portion 126 of the slide by a bent out lip 128 on the strip and a self-tapping screw 130. The strap also has a downwardly depending ear 132 to engage a portion of flange 118 on the hood. To complete the shielding of the tube, an arcuate metallic plate 134 is provided which is fastened to the flanges 108 of the slide by self-tapping screws 136, FIGS. 3 and 4. A lower front corner of the shield is cut away, as indicated at 138, FIG. 6, to allow for the presence of the flanges 126, 128, and snug fit of the front end of the shield over the arcuate strap.

By the arrangement just described, the slide 108 may be moved toward and from the objective lens carried by the chassis 18 for obtaining proper focal distance.

An advantage of the arrangement described is that the entire assembly of scanner tube, slide, slide support and slide support supporting plate may be disconnected from the permanent mounting plate and screwed into the chassis 18 when the chassis 18 is also removed from the cabinet, for dynamic test purposes. For this purpose, vertical wall 32 of the chassis is provided with another pair of openings 140 below the openings 38 and 40 in registration with holes 70 in the supporting plate, the openings 140 of course being positioned to secure proper registration of the rectangular opening 74 in plate 66 with the objective lens when performing the dynamic test, at which time a test slide may be held in any convenient fashion before the face of the scanner tube.

After the test has been performed, the scanner tube assembly may be removed from the chassis and the chassis and assembly replaced in their respective compartments 14 and 16. By replacing the screws 22 into their original holes in the cabinet and the screws 70 in their original hole, original registration of the scanner tube and objective lens in the chassis 18 is again obtained.

The jig or alignment gauge 150 for securing alignment of chassis and scanner tube support is simply comprised of a cross bar 152 and two parallel legs or pins 154 at right angles to the bar and spaced apart the distance of the two holes 38, 40 in the chassis, the diameter of the pins being such as to snugly fit the diameter of the holes 38, 40 in the chassis and the alignment holes 54, 56 in the plate 52.

While there have been shown and described what are at present considered the preferred embodiments of the invention, it will be obvious to those skilled in the art that various changes and modifications may be made therein without departing from the scope of the invention as defined by the appended claims.

We claim:

1. A cabinet provided with a vertical partition wall;
a chassis fixedly mounted in the cabinet on a first side of the wall;
a cathode ray tube mounted in the cabinet on the other second side of said wall;
said chassis having at least one aligning hole therein;
a mounting plate for said tube permanently secured to said wall on the second side thereof;
said mounting plate having at least one aligning hole therein registering with the aligning hole in the chassis;
at least one hole in the partition wall of larger area than those of the aligning holes to permit passage of an aligning tool through the partition wall to secure alignment of the mounting plate with respect to the partition wall and chassis;

aligned apertures in the chassis, partition wall and mounting plate for passage therethrough of light on the face of the scanning tube; and an assembly including said tube and having a supporting plate removably secured to the mounting plate and in fixed relation thereto;

the face of the scanning tube being in alignment with the aforesaid apertures, the supporting plate having an aperture aligned with the other apertures.

2. A structure as set forth in claim 1 in which said supporting plate and chassis have holes therein which register when the light passing apertures are in registration with each other to enable dynamic servicing of parts with the scanning tube mounted directly on the chassis.

3. A structure as set forth in claim 1 in which the supporting plate fixedly mounts a slide support, said tube being supported by said slide support.

4. A structure as set forth in claim 1 in which the supporting plate fixedly mounts a slide support and a metallic slide on said support adjustable to and from said partition wall, the tube being fixedly mounted on said slide.

5. The structure of claim 4 in which the tube is shielded against stray X-ray emanation.

6. The structure of claim 5 in which the shielding includes a flange at the top of said mounting plate extending at right angles to the plate and away from the partition wall.

7. The structure of claim 5 in which the shielding includes the frustum of a cone having its base at the face of the scanning ray tube and extending toward the objective lens in the chassis.

8. The structure of claim 4 in which the slide has upstanding flanges to which an arcuate metallic plate is fastened, said slide and arcuate plate encompassing the tube and forming a shield therefor.

9. The structure of claim 4 in which the tube is held to the slide by a strap at the front end of the tube, said strap being fastened at its ends to said slide.

10. The structure of claim 9 in which the strap has a downwardly depending ear, the ear engaging a flange on a conical shielding means at the face of the tube to assist in holding the shielding means in place.

References Cited

UNITED STATES PATENTS 3,472,952 10/1969 Alway -------------- 178—6.8

RICHARD MURRAY, Primary Examiner

R. K. ECKERT, Jr., Assistant Examiner

U.S. Cl. X.R.

178—7.82, 7.9